US008054382B2

(12) United States Patent
Burckart et al.

(10) Patent No.: US 8,054,382 B2
(45) Date of Patent: Nov. 8, 2011

(54) APPARATUS, METHOD AND SYSTEM FOR SYNCHRONIZING A COMMON BROADCAST SIGNAL AMONG MULTIPLE TELEVISION UNITS

(75) Inventors: Erik John Burckart, Raleigh, NC (US); Steve Russell Campbell, Lillington, NC (US); Andrew Ivory, Durham, NC (US); Aaron Kyle Shook, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1205 days.

(21) Appl. No.: 11/751,623

(22) Filed: May 21, 2007

(65) Prior Publication Data

US 2008/0291266 A1    Nov. 27, 2008

(51) Int. Cl.
*H04N 5/66* (2006.01)
*H04N 9/12* (2006.01)
*H04N 5/04* (2006.01)
*H04N 9/44* (2006.01)
*H04N 5/44* (2011.01)
*H04N 7/18* (2006.01)
*H04N 5/38* (2006.01)
*G09G 5/00* (2006.01)

(52) U.S. Cl. .......... 348/553; 348/383; 348/500; 348/21; 345/2.2; 725/80

(58) Field of Classification Search .................... 348/21, 348/500, 383, 553; 345/1.1, 2.1, 2.2, 2.3
See application file for complete search history.

(56) References Cited

U.S. PATENT DOCUMENTS

| 5,453,796 | A | * | 9/1995 | Duffield et al. | 348/565 |
|---|---|---|---|---|---|
| 5,461,427 | A | * | 10/1995 | Duffield et al. | 348/555 |
| 5,530,484 | A | * | 6/1996 | Bhatt et al. | 348/556 |
| 5,565,929 | A | * | 10/1996 | Tanaka | 348/565 |
| 5,610,661 | A | * | 3/1997 | Bhatt | 348/446 |
| 5,874,960 | A | * | 2/1999 | Mairs et al. | 715/733 |
| 5,956,046 | A | * | 9/1999 | Kehlet et al. | 345/502 |
| 6,151,078 | A | * | 11/2000 | Yoneda et al. | 348/558 |
| 6,380,979 | B1 | * | 4/2002 | Tokoi et al. | 348/458 |
| 6,574,674 | B1 | * | 6/2003 | May et al. | 719/310 |
| 6,600,522 | B1 | * | 7/2003 | Kim | 348/732 |
| 6,630,963 | B1 | * | 10/2003 | Billmaier | 348/485 |
| 6,710,815 | B1 | * | 3/2004 | Billmaier et al. | 348/515 |
| 6,714,253 | B2 | * | 3/2004 | Kim et al. | 348/556 |
| 6,864,894 | B1 | * | 3/2005 | Lefebvre et al. | 345/506 |
| 6,900,844 | B2 | * | 5/2005 | Itaki et al. | 348/383 |
| 7,136,399 | B2 | * | 11/2006 | Lanigan et al. | 370/517 |
| 7,161,561 | B2 | * | 1/2007 | Kitayama | 345/9 |
| 7,184,035 | B2 | * | 2/2007 | Sato et al. | 345/213 |
| 7,224,404 | B2 | * | 5/2007 | An et al. | 348/584 |
| 7,242,369 | B2 | * | 7/2007 | Huang | 345/1.1 |
| 7,342,588 | B2 | * | 3/2008 | Lefebvre et al. | 345/506 |
| 7,446,731 | B2 | * | 11/2008 | Yoon | 345/2.2 |
| 7,450,148 | B2 | * | 11/2008 | Kim et al. | 348/14.01 |
| 7,453,418 | B2 | * | 11/2008 | Palmquist | 345/1.1 |
| 7,475,181 | B2 | * | 1/2009 | Arai et al. | 710/305 |
| 7,483,448 | B2 | * | 1/2009 | Bhandari et al. | 370/503 |
| 7,489,337 | B2 | * | 2/2009 | Houmeau et al. | 348/182 |
| 7,499,044 | B2 | * | 3/2009 | Kennedy et al. | 345/213 |

(Continued)

*Primary Examiner* — Brian Yenke

(74) *Attorney, Agent, or Firm* — Lee Law, PLLC; Christopher B. Lee

(57) ABSTRACT

The invention provides an apparatus, system and method for allowing multiple television (TV) sets to communicate with each other in synchronizing their audiovisual signal output (when set to the same TV channel) to allow simultaneous viewing of common programming content.

18 Claims, 1 Drawing Sheet

U.S. PATENT DOCUMENTS

Figure 1:
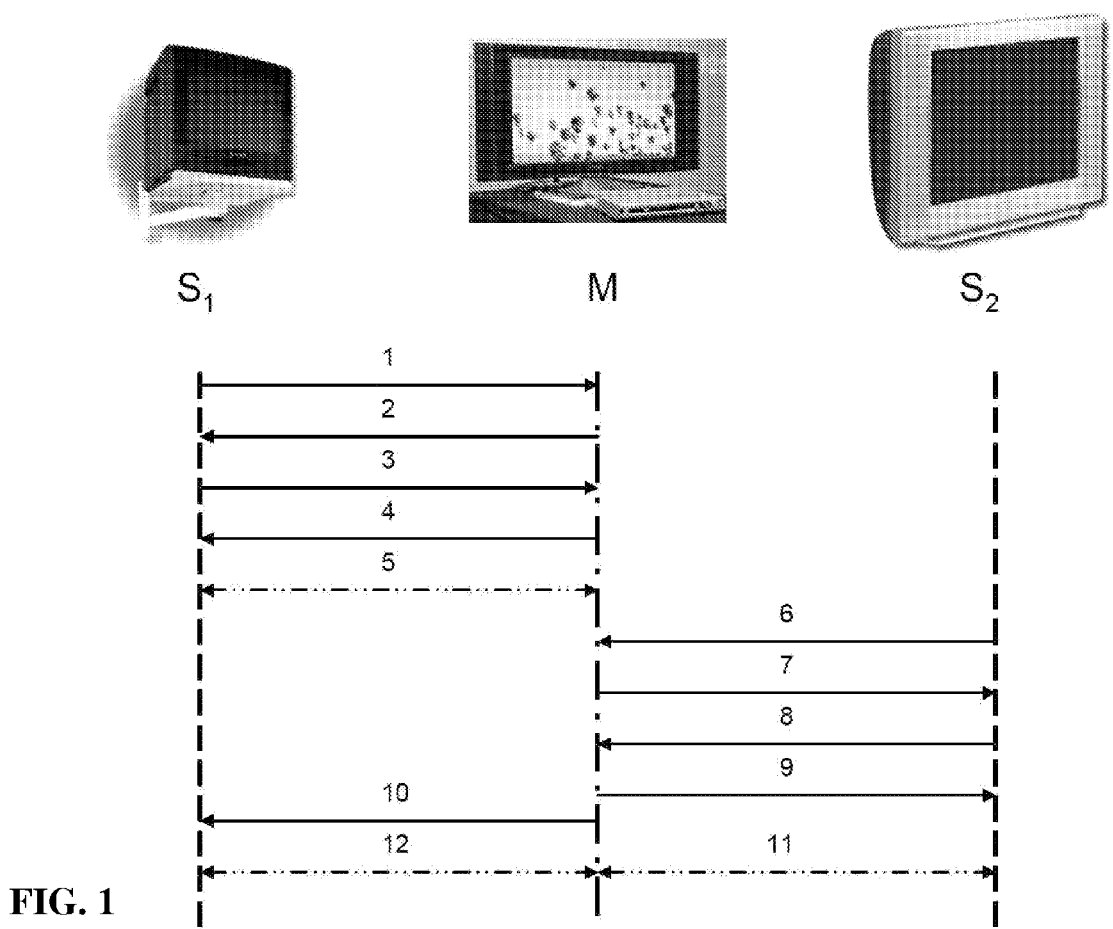

| | | | |
|---|---|---|---|
| 7,589,734 B2* | 9/2009 | Mawatari et al. | 345/501 |
| 7,667,706 B2* | 2/2010 | Mawatari et al. | 345/501 |
| 7,719,480 B2* | 5/2010 | Devos et al. | 345/1.3 |
| 7,834,869 B2* | 11/2010 | Kondo et al. | 345/211 |
| 7,868,848 B2* | 1/2011 | Dai et al. | 345/1.1 |
| 7,901,293 B2* | 3/2011 | Oe | 463/42 |
| 2002/0021259 A1* | 2/2002 | Itaki et al. | 345/1.1 |
| 2002/0093590 A1* | 7/2002 | Hodgkiss et al. | 348/500 |
| 2004/0177372 A1* | 9/2004 | Du et al. | 725/59 |
| 2005/0093854 A1* | 5/2005 | Kennedy et al. | 345/213 |
| 2008/0079658 A1* | 4/2008 | Naito et al. | 345/2.2 |
| 2008/0204358 A1* | 8/2008 | Sato et al. | 345/2.2 |
| 2009/0160731 A1* | 6/2009 | Schuler et al. | 345/1.1 |
| 2009/0174780 A1* | 7/2009 | Houmeau et al. | 348/182 |
| 2010/0110062 A1* | 5/2010 | Kennedy et al. | 345/213 |

* cited by examiner

APPARATUS, METHOD AND SYSTEM FOR SYNCHRONIZING A COMMON BROADCAST SIGNAL AMONG MULTIPLE TELEVISION UNITS

TECHNICAL FIELD

The invention relates to synchronizing a common broadcast signal among multiple television units.

BACKGROUND

Many television (TV) users prefer to view multiple TV set units simultaneously tuned to the same broadcast station and/or television program (for example in a bar or restaurant displaying multiple TV sets tuned to the same sporting event) and many homes have televisions in different rooms of the house (such as the kitchen and/or living room and/or bedroom) that are all simultaneously tuned to the same TV channel to allow a user to view the same program while moving between rooms.

With the advent of cable and satellite TV control units along with digital video recorders (DVRs) as well as high-definition (HD) TV sets (and other "pass-through" electronic devices) for processing television signals, delay can be introduced into one or more of the signals during processing to cause the timing of commonly displayed programming content to become unsynchronized (i.e., "out of sync") when simultaneously viewed on multiple TV sets, which in turn can create audio "sound echoes" and mismatched video streams. There are no known solutions to this problem other than to "splice" (or manually split) a single signal between two or more television sets in order to "sync" the audio and visual images so that they are all displayed in concert with each other.

SUMMARY OF THE INVENTION

The invention provides an apparatus, system and method for allowing multiple television (TV) sets to communicate with each other in synchronizing the timing of their audio and/or video signal output (when set to the same TV channel) to allow simultaneous viewing of common programming content (irrespective of the different "pass through" electronic devices that may be used to process the displayed TV signals) for each individual television. One of the TV sets is provided with a "master timing device" that communicates with "slave timing device(s)" incorporated into one or more other TV set(s) in the system to coordinate the synchronization of commonly received television signal(s) (by introducing a processing delay into one or more of the signals) so that they are all simultaneously displayed on each TV set. The system can work with any number of television sets in order to synchronize the timing of common audiovisual programming content.

It is therefore an object of the present invention to provide an apparatus, system and method for allowing multiple television (TV) sets to communicate with each other in synchronizing their audiovisual signal output.

It is another object of the present invention to provide a TV set with a "master timing device" that communicates with "slave timing device(s)" incorporated into other TV set(s) to coordinate the synchronization of commonly received television signal(s) (by introducing a processing delay into one or more of the signals) so that they are simultaneously displayed on each TV set.

The subject matter which is regarded as the invention is particularly pointed out and distinctly claimed in the concluding portion of the specification. The invention, however, together with further objects and advantages thereof, may best be understood by reference to the following description taken in conjunction with the accompanying drawings.

BRIEF DESCRIPTION OF THE DETAILED DRAWINGS

FIG. 1 illustrates a diagram outlining operation of a television (TV) system according to the invention.

DETAILED DESCRIPTION OF THE PREFERRED EMBODIMENTS

FIG. 1 illustrates a diagram outlining operation of a television (TV) system according to a preferred embodiment of the invention, where a television user electronically and/or programmatically configures a "master timing device" M (connected to a single TV set) to communicate with timing devices connected to any number of other system televisions ("slave TV set timing device(s)" S1 and/or S2) in order to synchronize display of their audio and/or video signal(s) with that of the "master TV" set (and with each other) when the same television channel and/or program is being simultaneously viewed on the master TV set M as well as the slave TV set(s) S1 and/or S2. For example, if television set M (the "master TV set") and television set(s) S1 and/or S2 (the "slave TV set(s)") are viewing the same television channel (and/or program) and TV set M has a DVR unit attached (while the other(s) do not) then the audio and/or visual signal(s) processed for display on TV set M will ordinarily be lagging behind that of TV set(s) S1 and/or S2 by a certain period of time (for example approximately 5 seconds) unless the "master" and "slave" timing device(s) are employed to cause TV set(s) S1 and/or S2 to delay (or "buffer") the timing of its/their signal(s) in order to synchronize them with the signal(s) displayed on TV set M.

In an example initial state, master television (TV) set (M) is activated (or "turned on") at the same time that one slave TV set (S1) is deactivated (or "turned off") and another slave TV set (S2) is turned on (but tuned to a different channel and/or program than TV set M). The status of each slave TV set is tracked by a "slave timing device" (S1 and/or S2) that notifies the "master timing device" of TV set M of its presence and broadcasting status (similar in operation to a "bluetooth device" installed in a cellular telephone). As shown in FIG. 1, the following operations are preferably carried out to synchronize common television signal(s) for simultaneous display by TV sets M and S1 and/or S2: (1) TV set S1 is turned on and its "slave timing device" alerts the "master timing device" M of the television channel and/or program to which S1 is tuned; (2) TV set M then determines if it and TV set S1 are tuned to the same station (and/or programming content) and if so then M queries S1 for the current position of its displayed media (as indicated by a "frame position" of the received analog or digital audiovisual broadcast signal); (3) S1 returns its current "media position" to M; (4) M evaluates the S1 "media position" to determine if one of their signal(s) is more delayed in reception timing than the other (and if the signal for TV set M is not the most delayed then it automatically sets the "master timing device" to introduce an appropriate processing delay into its own signal so that it is the most delayed in time) and M sends this "delayed media position" to S1; (5) S1 synchronizes its "media position" with that of M (by "buffering" its own signal if necessary) to introduce a processing delay that will cause both signals to be simultaneously displayed in "real time"; (6) TV set S2 then tunes its signal to the same program also being viewed on TV set(s) M and S1 (and M is alerted of this via communication between the "slave timing device" for S2 and the "master timing device"); (7) M queries S2 for its current "media position"; (8) S2 returns its current "media position" to M; (9) if the "media position" for S2 is more delayed than that of M then M waits to synchronize for a pre-defined amount of time (e.g., for a commercial break as indicated by a "black frame") in order to set its (already) "delayed media position" to be greater than that of S2, and if the "(already delayed) media position" for M is more delayed than that of S2 then that current time delay value is maintained for M and it sends the "delayed media position" to S2; (10) M sends its current (adjusted/updated) "delayed media position" to S1 if necessary (i.e., only if its value has changed from that originally sent to S1); (11) S2 synchronizes its "media position" with that of M (by "buffering" if necessary as described for S1); (12) S1 re-synchronizes its "media position" with that of M if necessary (if the "delayed media position" for M has changed).

The "master timing device" M can also detect whether the same program is being viewed on different television channels (i.e. on a "high definition" (HD) channel using an HDTV set and also on a "standard definition" (SD) channel using another non-HD TV set) and/or using different means of signal reception (i.e., via an antenna as opposed to cable or satellite transmission or using "wifi"/internet technology) for different televisions within the system. Such determinations can be based on signal-defining "media position metadata" that is attached to each received signal (indicating its source and nature) and can be used to adjust the processing delay introduced into each different TV accordingly. (If a television is tuned to a different program then there is no need to synchronize its signals with the rest of the TVs in the system.)

While certain preferred features of the invention have been shown by way of illustration, many modifications and changes can be made that fall within the true spirit of the invention as embodied in the following claims, which are to be interpreted as broadly as the law permits to cover the full scope of the invention, including all equivalents thereto.

What is claimed is:

1. A system, comprising:
 a master television set configured for use as a master timing device to coordinate synchronization of one or more common broadcast television signals also received by at least one other television set; and
 at least a second television set configured as a slave timing device in communication with the master timing device for displaying a common audiovisual signal output;
 where the master television set is configured to:
  receive an alert indicating a tuning event of one of a television channel and a television program tuned by the second television set and a current media position of the second television set from the second television set;
  determine, in response to the alert, whether the second television set is tuned to a same television channel and television program as a television channel and television program tuned by the master television set and whether a media position of the master television set is a most-delayed media position relative to the current media position of the second television set;
  introduce, in response to determining that the second television set is tuned to the same television channel and television program as the television channel and television program tuned by the master television set and that the media position of the master television set is not the most-delayed media position, a processing delay into the media position of the master television set to create a greater delay in the media position of the master television set than the current media position of the second television set; and
  send the media position of the master television set to the second television set, where the second television set synchronizes with the media position of the master television set by delaying the current media position of the second television set.

2. The system of claim 1, where the master television set is further configured to:
 determine that the second television set is tuned to the same television program as the television program tuned by the master television set via a different television channel than the television channel tuned by the master television set; and
 introduce, in response to determining that the second television set is tuned to the same television program as the television program tuned by the master television set via the different television channel and that the media position of the master television set is not the most-delayed media position, the processing delay into the media position of the master television set to the greater delay than the current media position of the second television set via the different television channel.

3. The system of claim 1, where the media position of the master television set comprises media position metadata that is used by the second television set to adjust the processing delay for the television program tuned by the second television set to synchronize display of the television program tuned by the second television set with display of the television program tuned by the master television set.

4. The system of claim 1, where:
 in being configured to introduce the processing delay into the media position of the master television set to create the greater delay in the media position of the master television set than the current media position of the second television set, the master television set is configured to:
  wait for a commercial break in the television program tuned by the master television set; and
  introduce the processing delay into the media position of the master television set during the commercial break in the television program; and
 in being configured to send the media position of the master television set to the second television set, the master television set is configured to send the media position to the second television set in response to introducing the processing delay into the media position of the master television set during the commercial break in the television program tuned by the master television set.

5. The system of claim 1, where in being configured to receive the current media position of the second television set from the second television set, the master television set is configured to:
 query the second television set for the current media position of the second television set; and
 receive the current media position in response to querying the second television set for the current media position of the second television set.

6. The system of claim 1, where the master television set is further configured to:
 receive, at the master television set, a second alert indicating a tuning event of one of a television channel and a television program tuned by a third television set and a current media position of the third television set from the third television set;

determine, in response to the second alert, whether the third television set is tuned to the same television channel and television program as the television channel and television program tuned by the master television set and whether the media position of the master television set is a most-delayed media position relative to the current media position of the third television set;

introduce, in response to determining that the third television set is tuned to the same television channel and television program as the television channel and television program tuned by the master television set and that the media position of the master television set is not the most-delayed media position, a processing delay into the media position of the master television set to create a greater delay in the media position of the master television set than the current media position of the third television set; and send the media position of the master television set to the second television set and the third television set, where the second television set re-synchronizes with the media position of the master television set and the third television set synchronizes with the media position of the master television set by delaying the current media position of the third television set.

7. A method, comprising:

receiving, at a master television set configured as a master timing device to coordinate synchronization of common television broadcast signals with a second television set configured as a slave timing device, an alert indicating a tuning event of one of a television channel and a television program tuned by the second television set and a current media position of the second television set from the second television set;

determining, in response to the alert, whether the second television set is tuned to a same television channel and television program as a television channel and television program tuned by the master television set and whether a media position of the master television set is a most-delayed media position relative to the current media position of the second television set;

introducing, in response to determining that the second television set is tuned to the same television channel and television program as the television channel and television program tuned by the master television set and that the media position of the master television set is not the most-delayed media position, a processing delay into the media position of the master television set to create a greater delay in the media position of the master television set than the current media position of the second television set; and sending the media position of the master television set to the second television set, where the second television set synchronizes with the media position of the master television set by delaying the current media position of the second television set.

8. The method of claim 7, further comprising:

determining that the second television set is tuned to the same television program as the television program tuned by the master television set via a different television channel than the television channel tuned by the master television set; and introducing, in response to determining that the second television set is tuned to the same television program as the television program tuned by the master television set via the different television channel and that the media position of the master television set is not the most-delayed media position, the processing delay into the media position of the master television set to the greater delay than the current media position of the second television set via the different television channel.

9. The method of claim 7, where the media position of the master television set comprises media position metadata that is used by the second television set to adjust the processing delay for the television program tuned by the second television set to synchronize display of the television program tuned by the second television set with display of the television program tuned by the master television set.

10. The method of claim 7, where:

introducing the processing delay into the media position of the master television set to create the greater delay in the media position of the master television set than the current media position of the second television set comprises:

waiting for a commercial break in the television program tuned by the master television set; and introducing the processing delay into the media position of the master television set during the commercial break in the television program; and sending the media position of the master television set to the second television set comprises sending the media position to the second television set in response to introducing the processing delay into the media position of the master television set during the commercial break in the television program tuned by the master television set.

11. The method of claim 7, where receiving the current media position of the second television set from the second television set comprises:

querying the second television set for the current media position of the second television set; and receiving the current media position in response to querying the second television set for the current media position of the second television set.

12. The method of claim 7, further comprising:

receiving, at the master television set, a second alert indicating a tuning event of one of a television channel and a television program tuned by a third television set and a current media position of the third television set from the third television set;

determining, in response to the second alert, whether the third television set is tuned to the same television channel and television program as the television channel and television program tuned by the master television set and whether the media position of the master television set is a most-delayed media position relative to the current media position of the third television set;

introducing, in response to determining that the third television set is tuned to the same television channel and television program as the television channel and television program tuned by the master television set and that the media position of the master television set is not the most-delayed media position, a processing delay into the media position of the master television set to create a greater delay in the media position of the master television set than the current media position of the third television set; and sending the media position of the master television set to the second television set and the third television set, where the second television set re-synchronizes with the media position of the master television set and the third television set synchronizes with the media position of the master television set by delaying the current media position of the third television set.

13. An apparatus, comprising:
a tuner; and
a master timing device configured to coordinate synchronization of common television broadcast signals with a television set configured as a slave timing device and to:
receive an alert indicating a tuning event of one of a television channel and a television program tuned by the television set and a current media position of the television set from the television set;
determine, in response to the alert, whether the television set is tuned to a same television channel and television program as a television channel and television program tuned by the tuner via the master timing device and whether a media position of the master timing device is a most-delayed media position relative to the current media position of the television set;
introduce, in response to determining that the television set is tuned to the same television channel and television program as the television channel and television program tuned by the tuner via the master timing device and that the media position of the master timing device is not the most-delayed media position, a processing delay into the media position of the master timing device to create a greater delay in the media position of the master timing device than the current media position of the television set; and
send the media position of the master timing device to the television set, where the television set synchronizes with the media position of the master timing device by delaying the current media position of the television set.

14. The apparatus of claim 13, where the master timing device is further configured to:
determine that the television set is tuned to the same television program as the television program tuned by the tuner via the master timing device via a different television channel than the television channel tuned by the tuner via the master timing device; and
introduce, in response to determining that the television set is tuned to the same television program as the television program tuned by the tuner via the master timing device via the different television channel and that the media position of the master timing device is not the most-delayed media position, the processing delay into the media position of the master timing device to the greater delay than the current media position of the television set via the different television channel.

15. The apparatus of claim 13, where the media position of the master timing device comprises media position metadata that is used by the television set to adjust the processing delay for the television program tuned by the television set to synchronize display of the television program tuned by the television set with display of the television program tuned by the tuner via the master timing device.

16. The apparatus of claim 13, where:
in being configured to introduce the processing delay into the media position of the master timing device to create the greater delay in the media position of the master timing device than the current media position of the television set, the master timing device is configured to:
wait for a commercial break in the television program tuned by the tuner via the master timing device; and
introduce the processing delay into the media position of the master timing device during the commercial break in the television program; and
in being configured to send the media position of the master timing device to the television set, the master timing device is configured to send the media position to the television set in response to introducing the processing delay into the media position of the master timing device during the commercial break in the television program tuned by the tuner via the master timing device.

17. The apparatus of claim 13, where in being configured to receive the current media position of the television set from the television set, the master timing device is configured to:
query the television set for the current media position of the television set; and
receive the current media position in response to querying the television set for the current media position of the television set.

18. The apparatus of claim 13, where the master timing device is further configured to:
receive, at the master timing device, a second alert indicating a tuning event of one of a television channel and a television program tuned by a second television set and a current media position of the second television set from the second television set;
determine, in response to the second alert, whether the second television set is tuned to the same television channel and television program as the television channel and television program tuned by the tuner via the master timing device and whether the media position of the master timing device is a most-delayed media position relative to the current media position of the second television set;
introduce, in response to determining that the second television set is tuned to the same television channel and television program as the television channel and television program tuned by the tuner via the master timing device and that the media position of the master timing device is not the most-delayed media position, a processing delay into the media position of the master timing device to create a greater delay in the media position of the master timing device than the current media position of the second television set; and
send the media position of the master timing device to the television set and the second television set, where the television set re-synchronizes with the media position of the master timing device and the second television set synchronizes with the media position of the master timing device by delaying the current media position of the second television set.

* * * * *